United States Patent
Hammond

(10) Patent No.: US 6,685,590 B1
(45) Date of Patent: Feb. 3, 2004

(54) COMPOSITE POWER TRANSMISSION BELT

(76) Inventor: Jim Hammond, 4618 Carrington Way, Hilliard, OH (US) 43026

( * ) Notice: Subject to any disclaimer, the term of this patent is extended or adjusted under 35 U.S.C. 154(b) by 0 days.

(21) Appl. No.: 10/225,372

(22) Filed: Aug. 21, 2002

(51) Int. Cl.$^7$ ................................................. F16G 1/18
(52) U.S. Cl. ................................... 474/239; 267/167
(58) Field of Search ........................... 267/167, 81, 84, 267/259, 33, 166, 1.5, 180, 152, 153, 69, 73, 74; 474/237, 239, 256, 271

(56) References Cited

U.S. PATENT DOCUMENTS

| | | | | |
|---|---|---|---|---|
| 360,751 A | * | 4/1887 | Arnao, Jr. | .................... 474/261 |
| 2,288,669 A | | 7/1942 | Atkinson | ..................... 71/238 |
| 2,483,716 A | * | 10/1949 | White | ......................... 474/239 |
| 2,991,064 A | | 7/1961 | De Jean | ........................ 267/1 |
| 3,482,462 A | | 12/1969 | Dahlem | ........................ 74/238 |
| 4,051,741 A | * | 10/1977 | Marczewski | ................. 474/256 |
| 5,160,122 A | | 11/1992 | Balsells | ........................ 267/167 |

* cited by examiner

*Primary Examiner*—Jack Lavinder
*Assistant Examiner*—Xuan Lan Nguyen
(74) *Attorney, Agent, or Firm*—David A. Greenlee

(57) ABSTRACT

A composite endless power transmission belt has a resilient plastic outer tubular member with a cylindrical bore, and an inner coil spring member extending wholly and slidably within the cylindrical bore and endlessly through the bore. Assembly is by inserting the spring into the tubular member and screwing a reduced diameter end of the spring into the larger diameter spring end to form an endless belt. The lengths of both members are selected such that when uninstalled, the outer member is in compression and the inner member is in tension, yet when installed, the outer member is partially or completely decompressed and the inner member is in optimal operating tension.

6 Claims, 8 Drawing Sheets

COMPOSITE POWER TRANSMISSION BELT

BACKGROUND OF THE INVENTION

1. Technical Field

This invention relates to elastic power transmission belts and, more particularly, to an elastic composite power transmission belt that benefits from the characteristics of both components.

2. Background Art

Light duty power elastic transmission belts have been used for years to drive sewing machines and other small commercial machines. These have often included coil or garter springs, as shown, for example, in U.S. Pat. No. 3,482,462—Dahlem. In many applications the friction between the bare metal spring belt and the pulleys (and/or rollers) can excessively abrade both the belt and pulleys. In the transmission of power between rollers in light duty applications, urethane is usually well suited because of its excellent physical properties, which include elastic memory, flexibility and abrasive resistance. The primary drawback to the use of urethane is its inability to operate in heat, since its elastic memory declines as temperature rises. Compared to operation at 70° F., its resilience drops about 30% at 125° F., and up to 80% at 150° F. This drastically reduces its life at elevated temperature to a matter of days, rather than years. Thus urethane, although excellent at lower temperatures, is unsuited for use at higher temperatures.

Another drawback of urethane is its buildup of static electricity when it rubs against metal pulleys or rollers, due to urethane being a good insulator. This makes urethane belts unsuitable for use in many electronic, paper handling and clean room applications. Attempts have been made to add metal or carbon fillers to make it conductive, but these additives change the physical properties and can emit damaging conductive dust when the belts are abraded during operation.

A recent innovation in power transmission belts is the use of static dissipative elastic urethane, although its utility is limited by its resistivity, which is insufficient for many applications. It has been proposed to reinforce urethane belts with embedded conductive metal cables, but, since the cables stretch very little, the resulting belts are nearly inelastic, making them unsuitable for many applications. Such a reinforced belt is shown in U.S. Pat. No. 2,288,669—Atkinson, which shows a coil spring imbedded in a rubber and braided fabric encasement. In these belts, the composite is forced to act as a monolithic unit, as governed by the relative inelasticity of the rubber and braided encasement. The wire core acts as a reinforcement only.

Thus, urethane belts are commonly used at room temperatures, but are unsuited to operation at elevated temperatures or in applications that must be free of static electricity. Materials like silicone and rubber belts can stand up to high temperatures and can be filled with carbon to reduce static electricity, but they abrade easily and have insufficient resilience and consequent short life. Reinforced belts are too inelastic. Thus most heat resistant belts are made of metal coil springs and operate well at elevated temperatures, but have shortened lives due to frictional wear (abrasion).

Wire coil spring and elastomeric composites have also been used as seals, as shown in U.S. Pat. No. 5,160,122—Balsells. Here again, the coil spring is embedded in the elastomer by molding and can take shapes other than cylindrical.

It would be desirable to provide a urethane power transmission belt reinforced by a heat resistant conductive spring. Such a composite belt is not presently available in commerce.

BRIEF SUMMARY OF THE INVENTION

It is therefore an object of this invention to provide a urethane power transmission belt reinforced by a heat resistant conductive spring.

To produce such a belt, several obstacles must be overcome. There is a difficulty in simultaneously joining the ends of metal and plastic components together. Further, the differences in elasticity of metal and plastic materials in the same belt would under/overstretch one component if the stretch of the other component is optimized in a design. Urethane operates best when stretched 10%, but metal spring belts provide optimal operation when stretched about 30%.

Applicant has discovered how to produce a composite plastic and metal spring composite belt having optimal performance. This is done by providing an inner coil spring member slidable within the bore of a plastic tubular outer member, and precompressing the plastic member, while pretensioning the spring member in the uninstalled condition of the composite belt. When stretched upon installation, the stretching of the belt further tensions the spring member, and partly or completely decompresses the plastic member, resulting in little or no compression. This results in optimal tensioning of the spring member when installed over adjacent rollers or pulleys in operating condition, and assures no or little gap between the ends of the outer plastic member. Thus, the spring member is the driving member, while the tubular plastic member acts as a sheath, providing a composite belt having the desirable qualities of the plastic and the steel spring.

In one aspect this invention features a composite endless power transmission belt, comprising a resilient plastic outer tubular member having a cylindrical bore, and an inner coil spring member extending wholly and slidably within the cylindrical bore and endlessly through the bore, such that, when assembled but uninstalled, the outer tubular member is in compression and the inner coil spring member is in tension. Preferably, the inner and outer members are dimensioned so that, in installed condition, the spring member is in optimal operating tension.

In another aspect, this invention features a method of making a composite power transmission belt having an outer resilient plastic tubular member and an endless coil spring inner member slidingly received in the bore of the tubular outer member, comprising the steps of providing the outer member with a predetermined length, placing the inner member slidably within a bore of the outer member, and joining the ends of the inner member together to form an endless coil spring to compress the outer member and tension the inner member. Preferably, the inner and outer members are initially dimensioned so that, in installed condition, the outer member is uncompressed and the inner member is in optimal operating tension.

These and other objects and features of this invention will become more readily apparent upon reference to the following detailed description of a preferred embodiment, as illustrated in the accompanying drawings, in which:

DETAILED DESCRIPTION OF THE INVENTION

Figure 1:
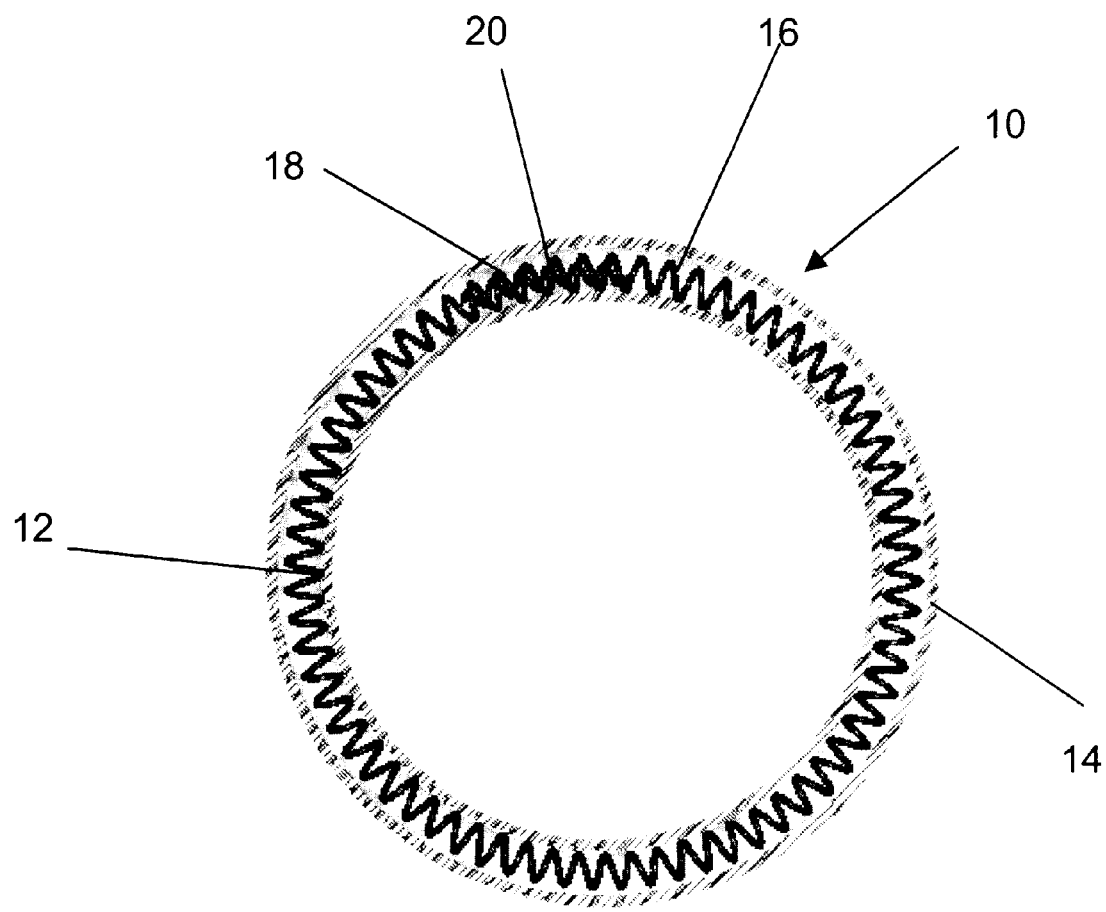
FIG. 1 is a sectional view of a composite power transmission belt according to this invention.
Figure 2:
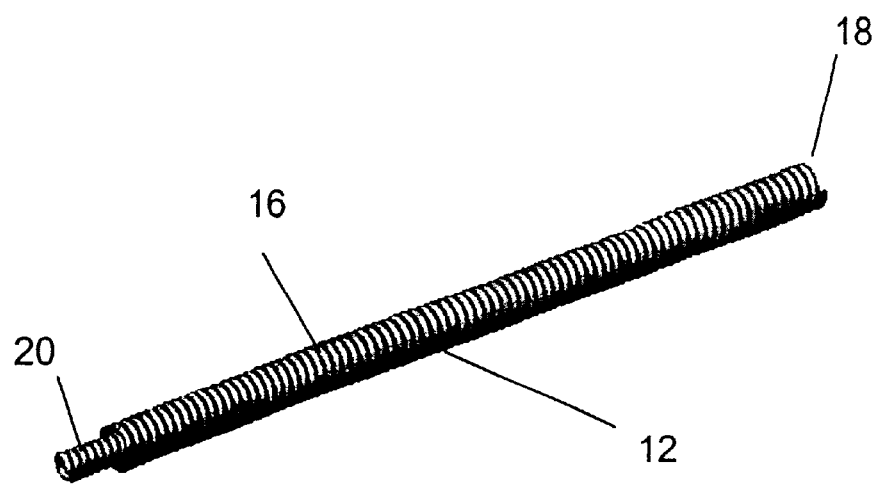
FIG. 2 is a perspective view of the inner spring member of the power transmission belt of FIG. 1.
Figure 3:
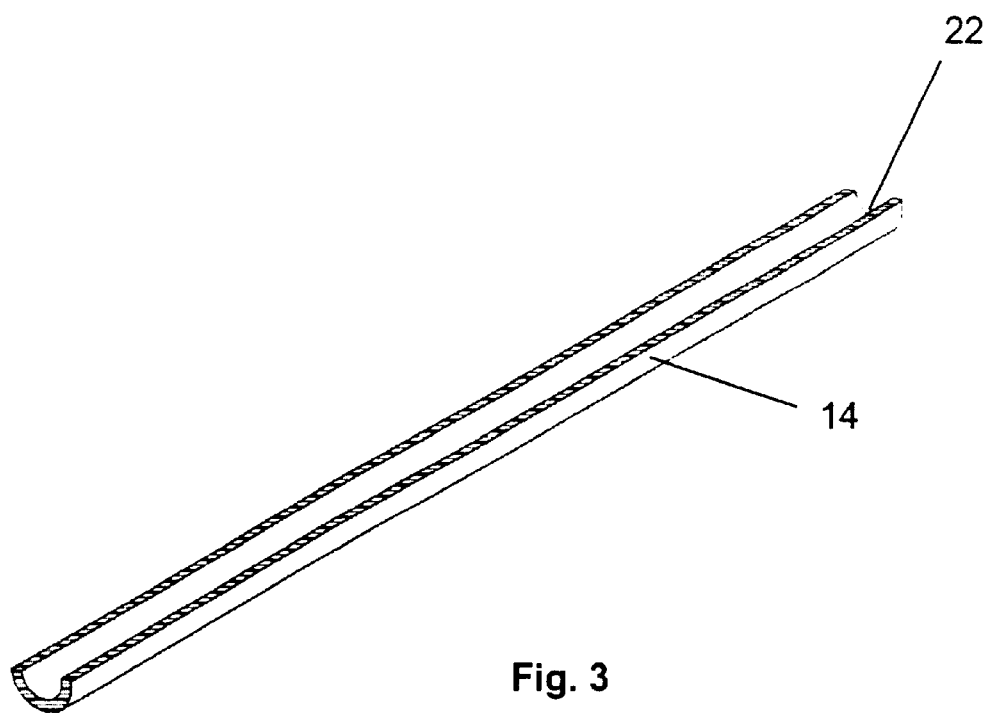
FIG. 3 is a perspective view of the tubular outer member of the power transmission belt of FIG. 1.

Referring now to FIGS. 1–3 of the drawings, a composite power transmission belt 10, according to this invention, comprises an inner spring member 12 and a resilient plastic outer tubular member 14. Spring member 12 is preferably made of spring steel and has a constant major diameter body 16 that terminates in an end 18 of the same diameter, while its other end 20 is of a reduced minor diameter. The outer minor diameter of end 20 is sized to enable threaded engagement with the inner diameter of major diameter end 18.

Outer tubular member 14 is preferably made of urethane. Alternative materials are silicone for outer member 14 and stainless steel for inner member 12. Other spring materials contemplated are composites, hard plastic and ceramics. Other tubular member materials contemplated are coolant-resistant Buna-N, chemical-resistant Viton and acid-resistant PVC and Hypalon.

Outer member 14 has an inner diameter 22 that is sized to slidingly and snugly receive inner spring member 12, as illustrated in FIG. 1. Composite power transmission belt 10 is assembled as follows.

Figure 4:
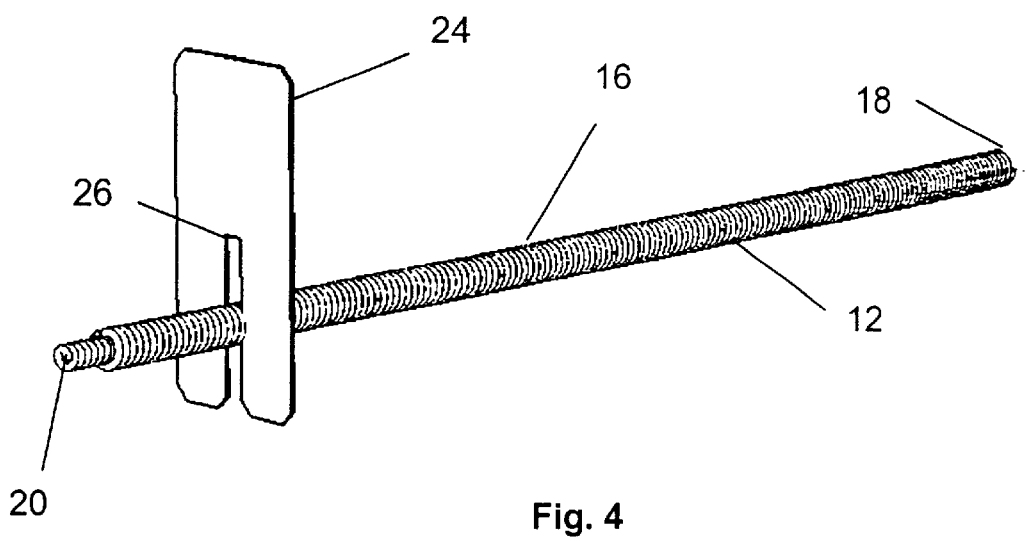
FIG. 4 is a partial perspective view of the spring of FIG. 2, showing a stop attached adjacent one end.

As shown in FIG. 4, initially, a stop member 24, having a slot 26 slightly narrower than the outer diameter of spring body 16, is slipped onto spring member 12 adjacent one of its ends, illustrated here as reduced diameter end 20. Next, an insertion tool 28 is inserted through the bore of tubular member 14. Insertion tool 28 has a handle 30 attached to a shaft 32 that is longer than tubular member 14. Shaft 32 terminates in a threaded fitting 34 that is sized for threaded insertion into spring end 18 (i.e. has the same diameter as spring end 20).

Figure 5:
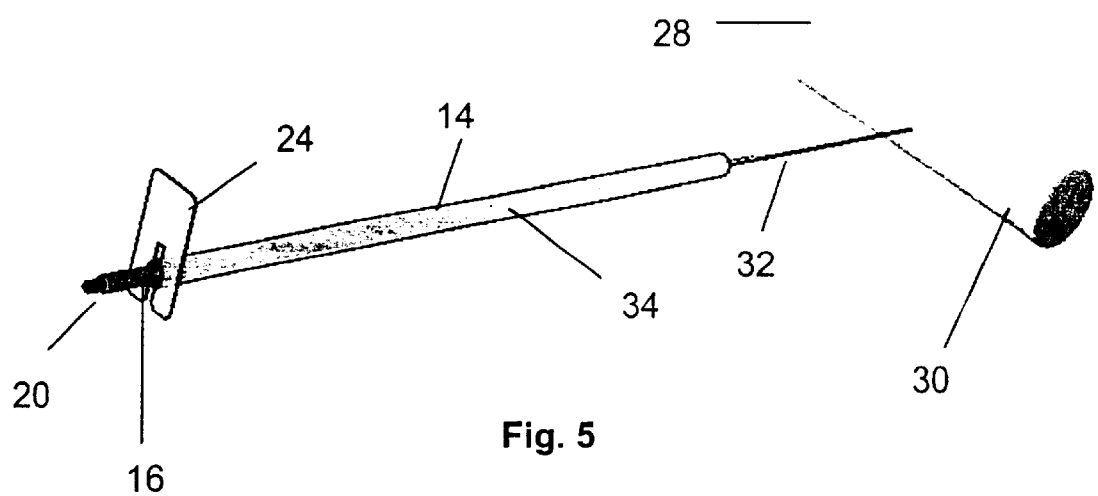
FIG. 5 is a partial perspective view of the spring of FIG. 4 being inserted into the bore of the tubular member of FIG. 3 by a twisting tool.
Figure 6:
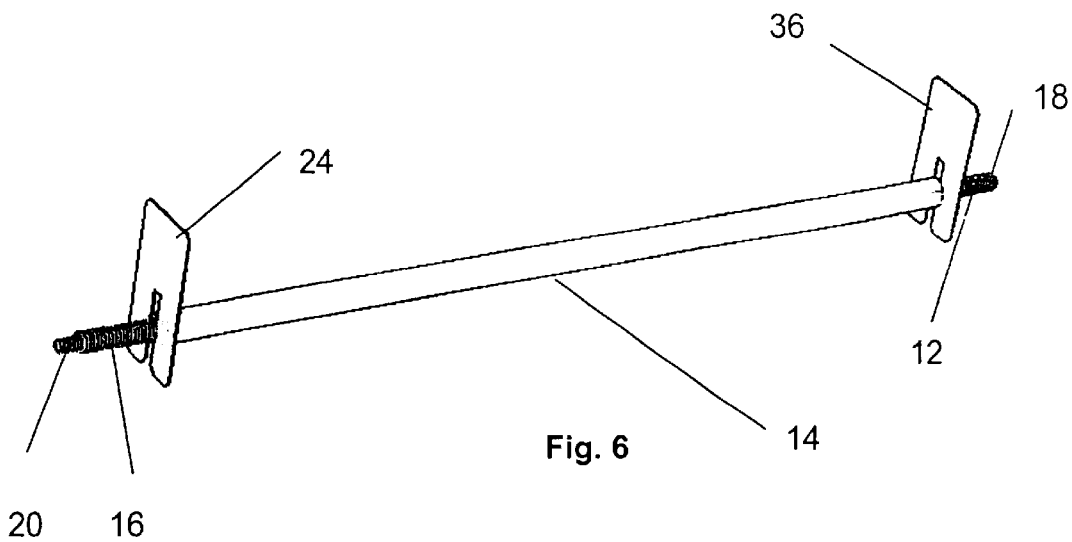
FIG. 6 is a perspective view of the spring inserted within the bore of the tubular member, with a second stop attached adjacent the other end to confine the tubular member compressed between the stops, forming a partial assembly.

Spring end 18 is then threaded onto tool fitting 34, tubular member 14 is firmly grasped, spring member 12 is pulled through bore 22 of tubular member 14, as shown in FIG. 5, and end 18 is pulled beyond the end of tubular member 14 to tension spring member 12 and compress tubular member 14. At this time a second stop member 36, identical to stop member 24, is slipped onto spring member 12 adjacent exposed end 18, and tubular member 14 is released to expand to compressed confinement between stops 24 and 36. Tool 28 is now removed from spring member 12, and the partially assembled composite power transmission belt 10 is as shown in FIG. 6.

Figure 7:
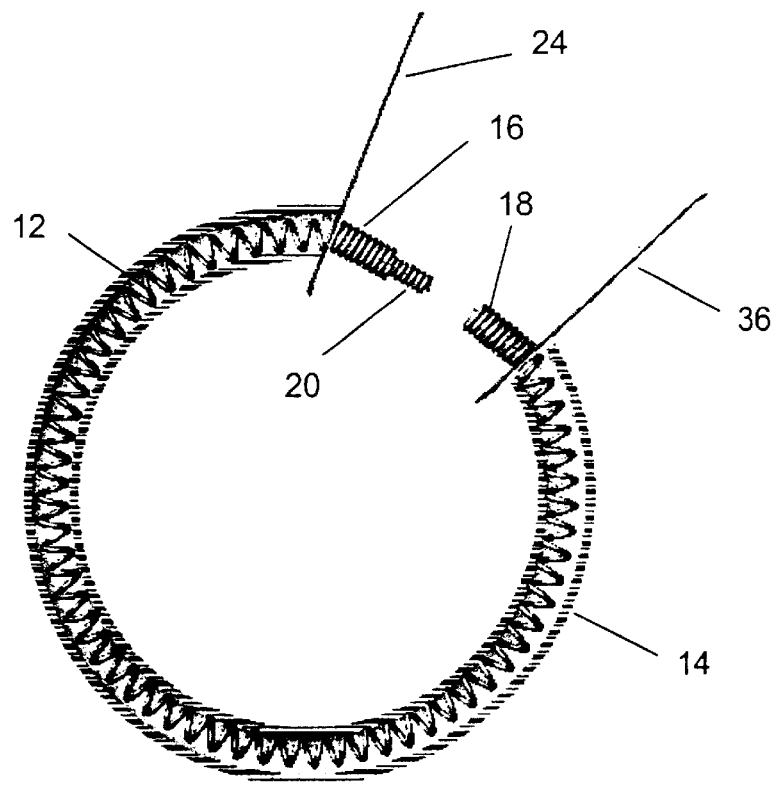
FIG. 7 is a plan view of the partial assembly of FIG. 6 prior to joining the spring ends together and removing the stops.

Finally, spring ends 18 and 20 are looped around into proximity with each other, as shown in FIG. 7. Both stop members 24 or 36 are firmly grasped and one of them is manipulated to back twist the adjacent end in an unscrewing motion. Spring ends 18 and 20 are then engaged, and the manipulated stop member is allowed to front twist in a screwing motion to enable end 20 to screw into end 18 and join the spring ends together into an endless spring. Stops 24 and 36 are now removed to enable the ends of tubular member 14 to close together to complete the assembly. In this assembled condition, the ends of outer member 14 engage each other to maintain member 14 in compression, while member 12 remains in tension. At this point, the ends of tubular member 14 could be joined by welding, fusion, adhesives, etc., but are preferably left unjoined.

Figure 8:
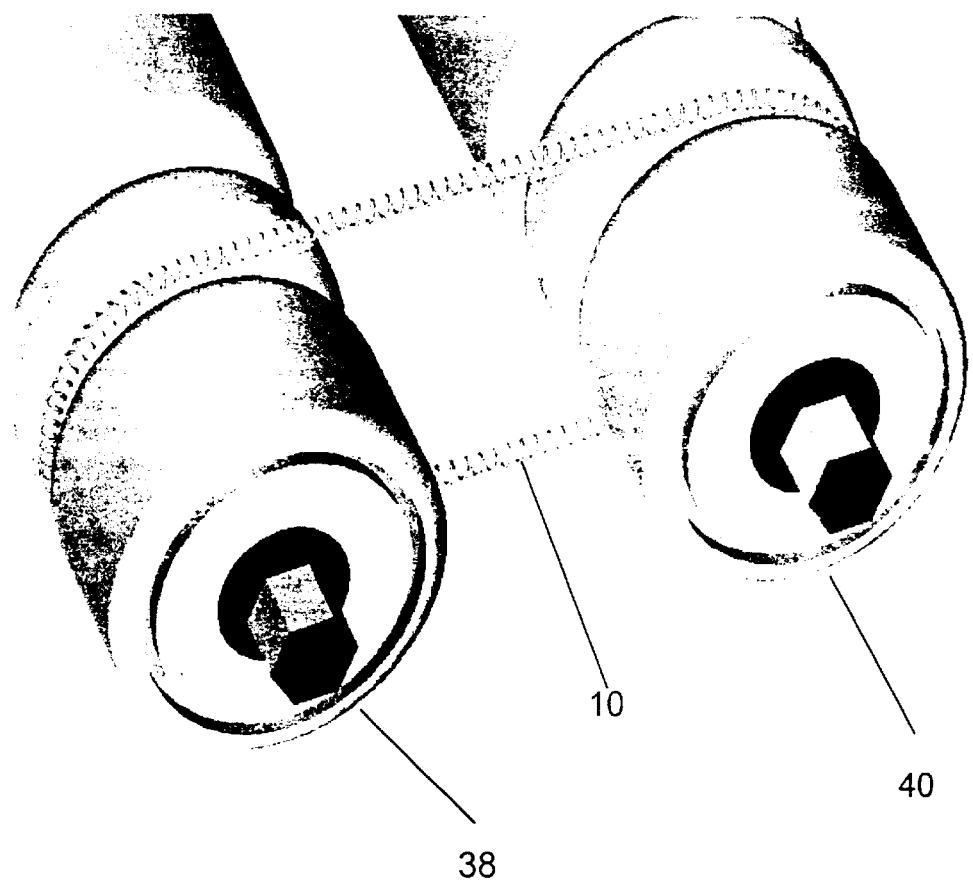
FIG. 8 is a view showing the assembled power transmission belt of FIG. 1 installed in operating condition.

The relative lengths of the inner and outer members are dependent on the materials used. The goal of length selection is to provide sufficient pretension on inner spring member 12 and sufficient compression of outer plastic member 14 that, when drive belt 10 is installed on drive rollers or pulleys 38, 40, as shown in FIG. 8, the outer plastic member is partly or completely decompressed and the inner spring member is optimally tensioned. For example a steel spring used as the power transfer member is optimally tensioned by stretching 30%. Since the outer plastic member is not the driving member, it need not be tensioned. In fact, the outer plastic member could actually have a small gap between ends when installed, without degrading the effectiveness or life of the installed power drive belt, although a slight compression is preferred to preclude any such gaps. Thus, for these materials, the lengths of members 12 and 14 are chosen so that assembly provides sufficient pre-compression of outer member 14 and sufficient pretension of inner member 12 to optimize the tension of the spring when installed in operating condition on drive rollers or pulleys 38, 40.

Figure 9:
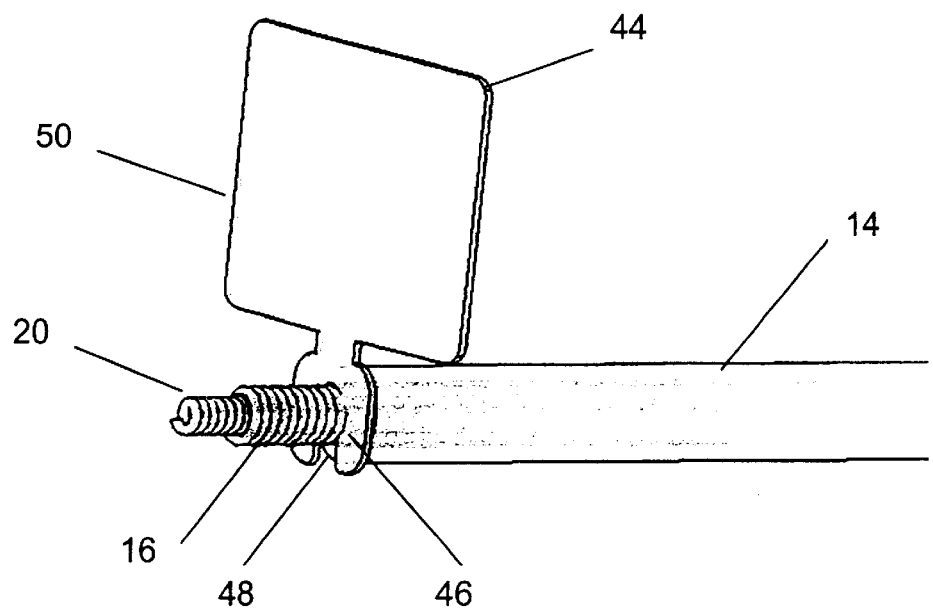
FIG. 9. is a detail view similar to FIG. 6, showing an alternative bendable stop initially installed.
Figure 10:
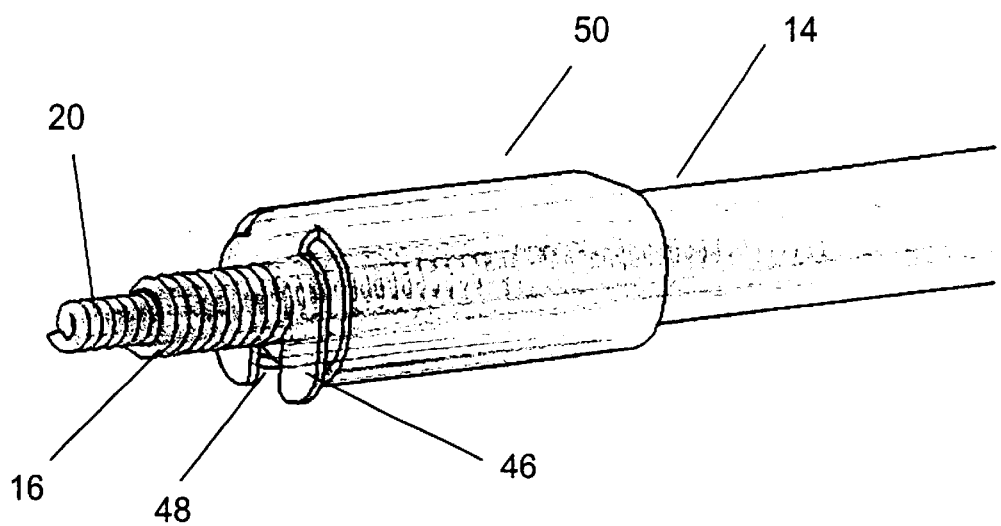
FIG. 10 is a view similar to FIG. 9, showing the stop bent into fully installed shape.

One alternative form of stop 44 is shown in FIGS. 9 and 10. Stop 44 is made of an easily deformable material having little elasticity. It comprises a forked section 46 having a slot 48 that embraces spring member 16 and a rectangular wing 50. After inserting stop member 44 as in FIG. 9, wing 50 is folded down and bent about the periphery of tubular member 14. This prevents stop 44 from being inadvertently dislodged during further handling. After assembly, wing 50 can be easily unbent and stop 44 easily removed, as above in regard to stops 24 and 36.

Figure 11:
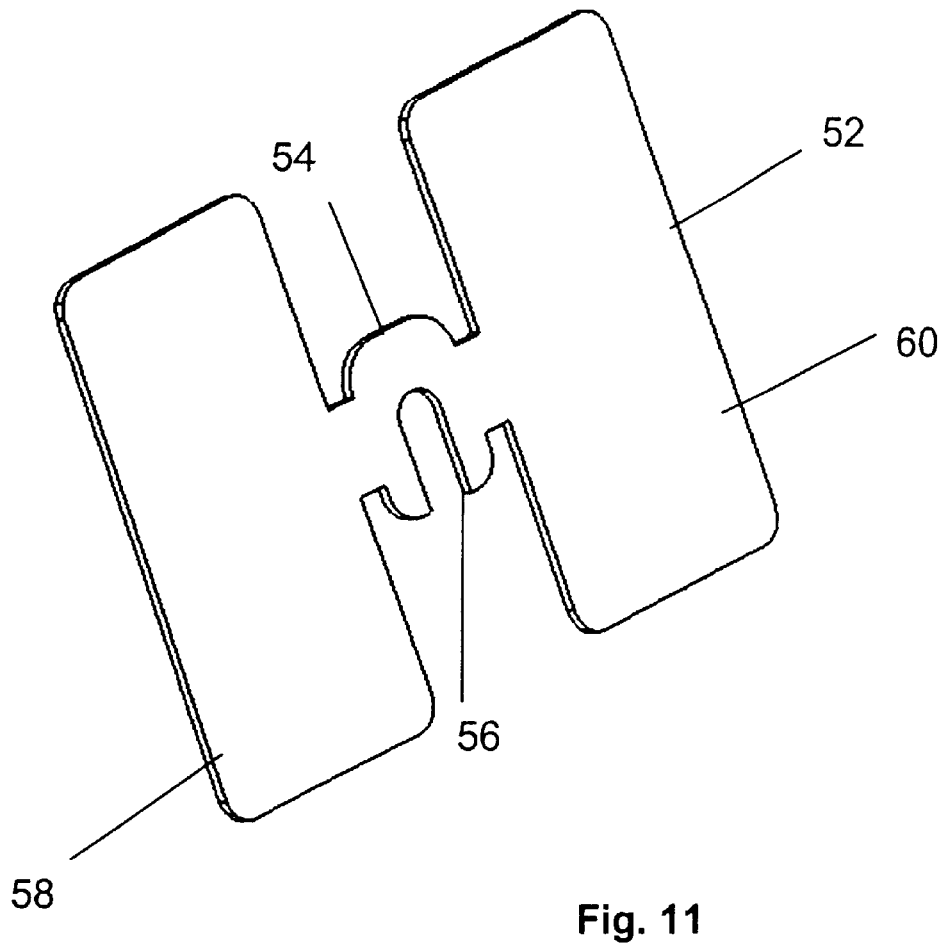
FIG. 11 is a perspective view of another form of bendable stop, shown before bent into fully installed shape.
Figure 12:
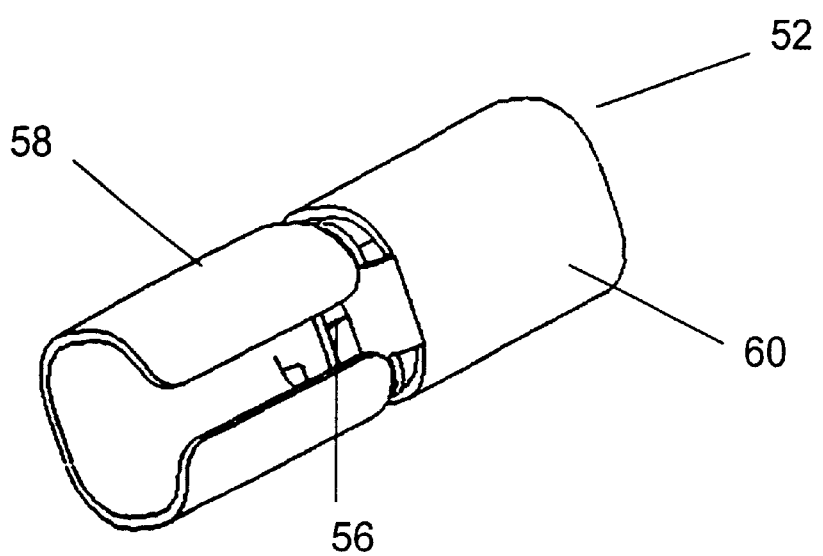
FIG. 12 is another view of the FIG. 11 stop, shown bent into fully installed shape.

Another alternative form of bendable stop 52 is shown in FIGS. 11 and 12. It includes forked section 54 having a slot 56 and a pair of wings 58 and 60, which can be bent down and around both sides of forked section 54, as shown in FIG. 12, or on the same side, not illustrated.

Figure 13:
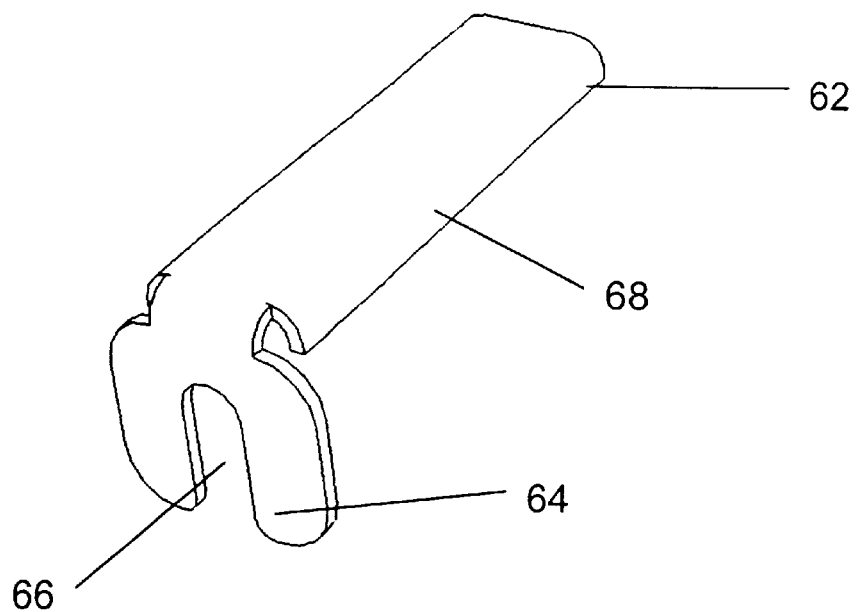
FIG. 13 is a perspective view of a form of tapable stop, shown before installation.
Figure 14:
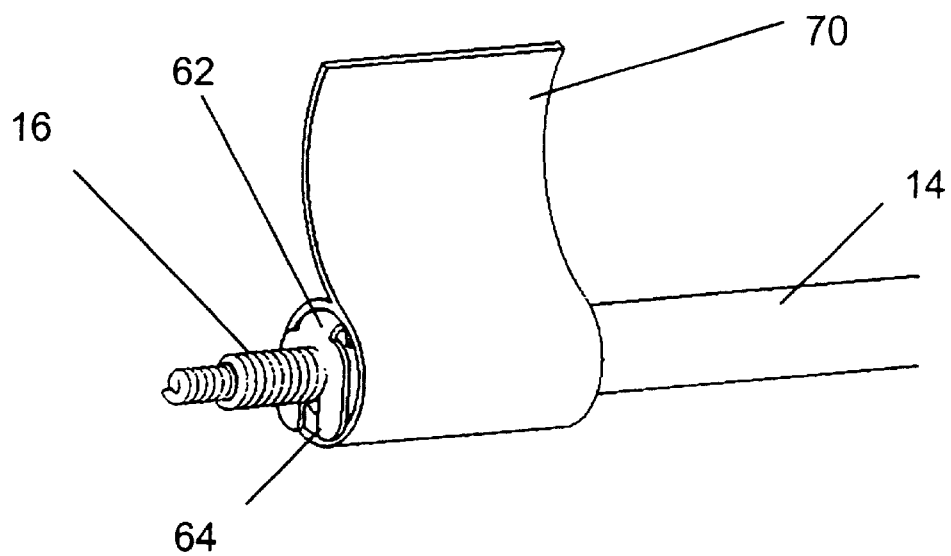
FIG. 14 is a view of the stop of FIG. 13, shown installed.

A further alternative form of stop is shown in FIGS. 13 and 14. A stop member 62 includes a slotted (66) forked section 64 and a wing 68 that embraces outer member 14 when installed. This enables tape 70 to be wound therearound to secure stop member 62 against unintentional dislodgement during handling. Tape 70 is left with a tail to facilitate removal of it and stop 62.

Thus, this invention provides a composite endless power transmission belt that has a resilient plastic outer tubular member with a cylindrical bore, and an inner coil spring member extending wholly and slidably within the cylindrical bore and endlessly through the bore. The lengths of the members are selected such that when uninstalled, the outer member is in compression and the inner member is in tension, yet when installed, the spring inner member is in optimal operating tension. As a result, this belt can operate at high temperatures because of its metal spring component, and has high abrasion resistance and high coefficient of friction because of its outer plastic component.

While only a preferred embodiment has been described and shown, obvious modifications are contemplated within the scope of this invention as defined by the following claims. For example, while a spring with reduced diameter end is illustrated and described above, an alternate construction would use a single diameter spring joined at the ends by a separate spring of reduced diameter that is threaded into both ends of the larger spring. Also, the spring ends could be hooked together by a separate member or by integral hooks on the spring ends. Although these and other embodiments are possible, the embodiment disclosed herein is preferred.

I claim:

1. A composite endless power transmission belt, comprising a resilient plastic outer tubular member having a cylindrical bore, and an inner coil spring member extending wholly and slidably within the cylindrical bore and endlessly through the bore, such that when uninstalled, said outer tubular member is in compression and said inner coil spring member is in tension, and when installed, the inner member is in tension.

2. The composite power transmission belt of claim 1, wherein the outer member is partially or completely decompressed when installed.

3. The composite power transmission belt of claim 2, wherein the inner coil spring member is made of spring steel.

4. The composite power transmission belt of claim 1, wherein the spring member initially comprises a length of spiral wound spring, and including means for joining the ends of the spring together to form the endless spring member.

5. The composite power transmission belt of claim 1, wherein the spring member initially comprises a spiral wound spring of constant diameter, except for a reduced diameter portion at one end, said reduced diameter portion being sized to enable threaded engagement with the spring other end when inserted and twisted to form said endless spring member in said bore, said spring member having a free length less than a free length of the tubular member to place said tubular member in compression once assembled.

6. The composite power transmission belt of claim 4, wherein the means for joining the spring ends together is a length of reduced diameter spiral wound spring being sized to enable threaded engagement with at least one end of the length of spiral wound spring when inserted and twisted to form said endless spring member.

* * * * *